(12) United States Patent
Sanders

(10) Patent No.: US 7,885,963 B2
(45) Date of Patent: Feb. 8, 2011

(54) FREE TEXT AND ATTRIBUTE SEARCHING OF ELECTRONIC PROGRAM GUIDE (EPG) DATA

(75) Inventor: Scott D. Sanders, Union City, CA (US)

(73) Assignee: Microsoft Corporation, Redmond, WA (US)

(*) Notice: Subject to any disclaimer, the term of this patent is extended or adjusted under 35 U.S.C. 154(b) by 1446 days.

(21) Appl. No.: 10/395,679

(22) Filed: Mar. 24, 2003

(65) Prior Publication Data
US 2004/0194141 A1 Sep. 30, 2004

(51) Int. Cl.
G06F 17/30 (2006.01)

(52) U.S. Cl. .......... 707/750; 707/706; 707/713; 707/722; 707/736; 707/748; 707/752; 707/754; 707/755; 707/758; 707/781; 707/791; 707/802; 707/822; 704/275; 704/270.1; 704/257; 725/53; 725/39; 725/40; 235/380; 709/203; 705/14

(58) Field of Classification Search .......... 704/275, 704/270.1, 257; 707/3, 706, 713, 722, 736, 707/748, 752, 754, 755, 758, 781, 791, 802, 707/822, 999.002, 999.003, 999.007, 999.01; 725/53, 39, 40; 235/380; 709/203; 705/14
See application file for complete search history.

(56) References Cited

U.S. PATENT DOCUMENTS

| | | | | |
|---|---|---|---|---|
| 5,992,737 A * | 11/1999 | Kubota | .......... | 235/380 |
| 6,456,978 B1 * | 9/2002 | Wymore et al. | .......... | 704/275 |
| 6,553,345 B1 * | 4/2003 | Kuhn et al. | .......... | 704/275 |
| 7,213,256 B1 * | 5/2007 | Kikinis | .......... | 725/53 |
| 2001/0049826 A1 * | 12/2001 | Wilf | .......... | 725/120 |
| 2002/0069218 A1 * | 6/2002 | Sull et al. | .......... | 707/501.1 |
| 2002/0143860 A1 * | 10/2002 | Catan | .......... | 709/203 |
| 2002/0151327 A1 * | 10/2002 | Levitt | .......... | 455/556 |
| 2003/0093790 A1 * | 5/2003 | Logan et al. | .......... | 725/38 |
| 2004/0177063 A1 * | 9/2004 | Weber et al. | .......... | 707/3 |

FOREIGN PATENT DOCUMENTS

| | | |
|---|---|---|
| EP | 1079371 A1 | 2/2001 |
| EP | 1094406 A2 | 4/2001 |
| EP | 1289287 A2 | 3/2003 |
| GB | 2340633 A | 2/2000 |
| GB | 2340633 A * | 2/2000 |
| RU | 2138076 C1 | 9/1999 |

OTHER PUBLICATIONS

Decision on Grant from the Russian Patent Office for Application No. 2004108667/09(009236), mailed on Mar. 30, 2009, 21 pgs.

* cited by examiner

Primary Examiner—Syling Yen
(74) Attorney, Agent, or Firm—Lee & Hayes, PLLC

(57) ABSTRACT

Subject matter includes a search engine for electronic program guide (EPG) data and related methods. In an exemplary method, a text search string can be normalized into searchable terms and the terms interpreted as either text search terms or attribute search terms. One or more queries having search conditions of varying degrees of complexity are created according to the interpretation of the terms of the search string. One or more searches in EPG databases and/or web-resources are performed based on interpretation of the text and attribute terms and results are given a relevancy ranking according to the interpretation. The combined search results may be grouped, ranked, and filtered for display to the user. Results may also be displayed progressively as each character of a search string is entered by the user.

29 Claims, 7 Drawing Sheets

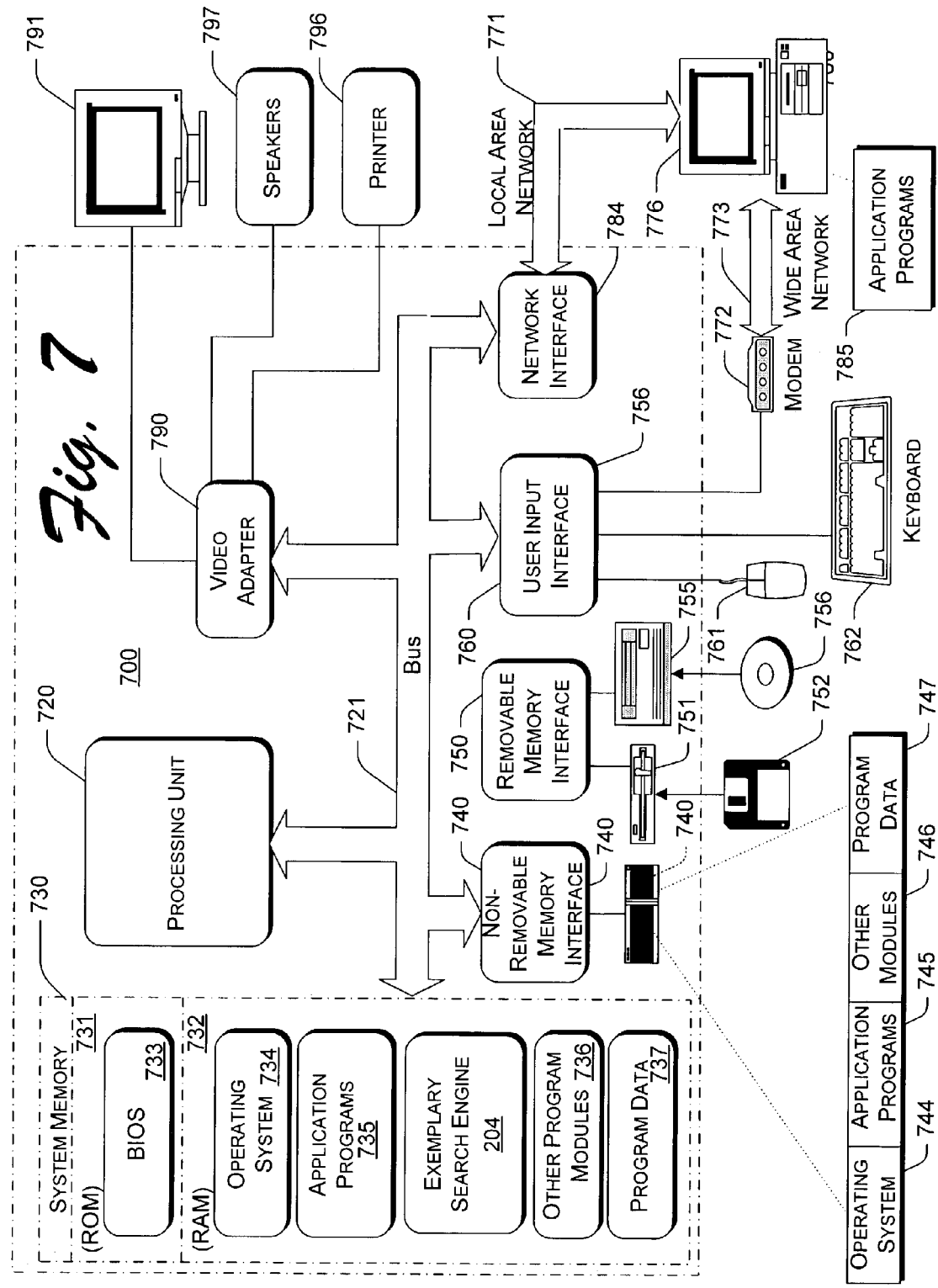

FREE TEXT AND ATTRIBUTE SEARCHING OF ELECTRONIC PROGRAM GUIDE (EPG) DATA

One set of XML text file listings used in accordance with the subject matter are provided in an appendix after the abstract on three sheets of paper and incorporated by reference into the specification. The XML text file listing is an exemplary list of attributes (e.g., block 310 of FIG. 3).

TECHNICAL FIELD

This invention relates generally to multimedia data communications and specifically to free text and attribute searching of electronic program guide (EPG) data.

BACKGROUND

In a digital television system, users typically search for program viewing information in an electronic program guide (EPG). An EPG is a dataset of program and schedule metadata that relate to programs available from a user's local headend (a programming provider's channel lineup) during an interval of time, for example one week. A user searches for programs by designating keyword terms to perform a text search of program titles. A search result, typically a program title, that fits the criteria of the search is known as a "hit."

Television programs can also be found by searching for program attributes, not just keywords from the program title. Although a program's title can be viewed as one attribute of the program, the term "attribute" is used more technically in the multimedia arts to describe many non-title characteristics of a program. As such, attributes include an unlimited myriad of characteristics about a program and its presentation. A program and its attributes typically fit into a vast hierarchy of EPG information. Some attributes, such as "category," may describe a broad set of programs of which the program being sought is a member, that is, the "category" attribute describes a hierarchical level inclusive of the program being sought, so that a user's search for the "category" attribute results in hits for every program in the category. A search for "westerns," for example, may result in many hits belonging to the western movie and television genre.

Attributes can also describe characteristics proper to a program title, i.e., attributes can describe options that cause two versions of the same program to vary from each other. This narrower type of attribute describes elements of the EPG hierarchy "below" a particular program, i.e., that cause the same program to have different flavors. For example, one version of "The Mountain" starring Spencer Tracy may have attributes of "black & white" and "monophonic" while another version has attributes of "color," "DOLBY® Digital," "close captioning," and "rated PG." A text search limited to keyword elements of the title will bring up both versions as hits, whereas a text search for keyword elements of the title combined with an attribute search for "Dolby" will bring up only the DOLBY® digital and DOLBY® Stereo sound system versions.

A conventional text search for a keyword element of the title is performed by entering keyword text into a search field of a user interface (UI), and a conventional attribute search is performed by entering the attribute criterion (e.g., in checkboxes) separately from the text search keywords in a separate part of the UI, or in a separate UI altogether. Hits from the separate text search and the separate attribute search are logically combined only at the end of both searches to produce a hit list.

FIG. 1 shows a conventional text search 100 and a conventional attribute search 102 wherein the text keywords and the attribute criteria are entered separately, such as in a search field separate from attribute checkboxes that are displayed via one or more UIs.

At block 104, the text keyword(s) are input. At block 106, the attribute criteria are input separately from the keyword(s) input. A text search is performed 108, typically on the program title, using the entered text keyword(s), and an attribute search is performed 110 using the entered attribute search criteria. Each separate search yields separate results 112, 114. Filtering logic 116 may compare the results 112, 114 and produces a hit list 118 that typically satisfies both the text search 100 and the attribute search 102.

Since users are typically required to search for attributes in a separate part of a UI, many restrict their search input to keyword style queries of program title words only, while others incorrectly enter attributes as keywords for a text search of program titles without realizing that the digital television system interprets the attributes thus entered as ordinary program title search terms.

SUMMARY

Subject matter includes a search engine for electronic program guide (EPG) data and related methods. In an exemplary method, a text search string can be normalized into searchable terms and the terms interpreted as either text search terms or attribute search terms. Queries using search logic of varying complexity are created according to the interpretation of the terms in the search string. One or more searches in EPG databases and/or EPG web-resources are performed for each text and each attribute term and results are given a relevancy ranking according to the interpretation of the search string. The combined search results may be ranked, filtered, and grouped for display to the user. Results may also be displayed progressively as each character of a search string is entered by the user.

In one implementation, a list of attributes can be used to separate the text terms from the attribute terms. An exemplary list of attributes may additionally contain indexes or metadata for each attribute that direct the course of searches performed for each attribute term in the search string.

BRIEF DESCRIPTION OF THE DRAWINGS

FIG. 7 is a block diagram of an exemplary computing device environment in which to practice the subject matter.

DETAILED DESCRIPTION

Overview

Quick, intuitive, and accurate searching of electronic program guide (EPG) data is important to end-users of digital television systems, including both "set-top box" systems added to a television set and personal computer (PC) systems capable of receiving and recording television broadcasts. Exemplary subject matter describes a search engine and related methods for entering and interpreting a user's text and attribute queries in a digital television system. This quick and accurate search mechanism interprets, for example, a single text string input by a user and infers the user's likely intent, displaying a set of hit results that attempts to match the interpretation of what the user is searching for. Such advanced search capabilities are important as the PC digital video recorder (DVR) and set-top box markets expand at a rapid rate.

Figure 1:
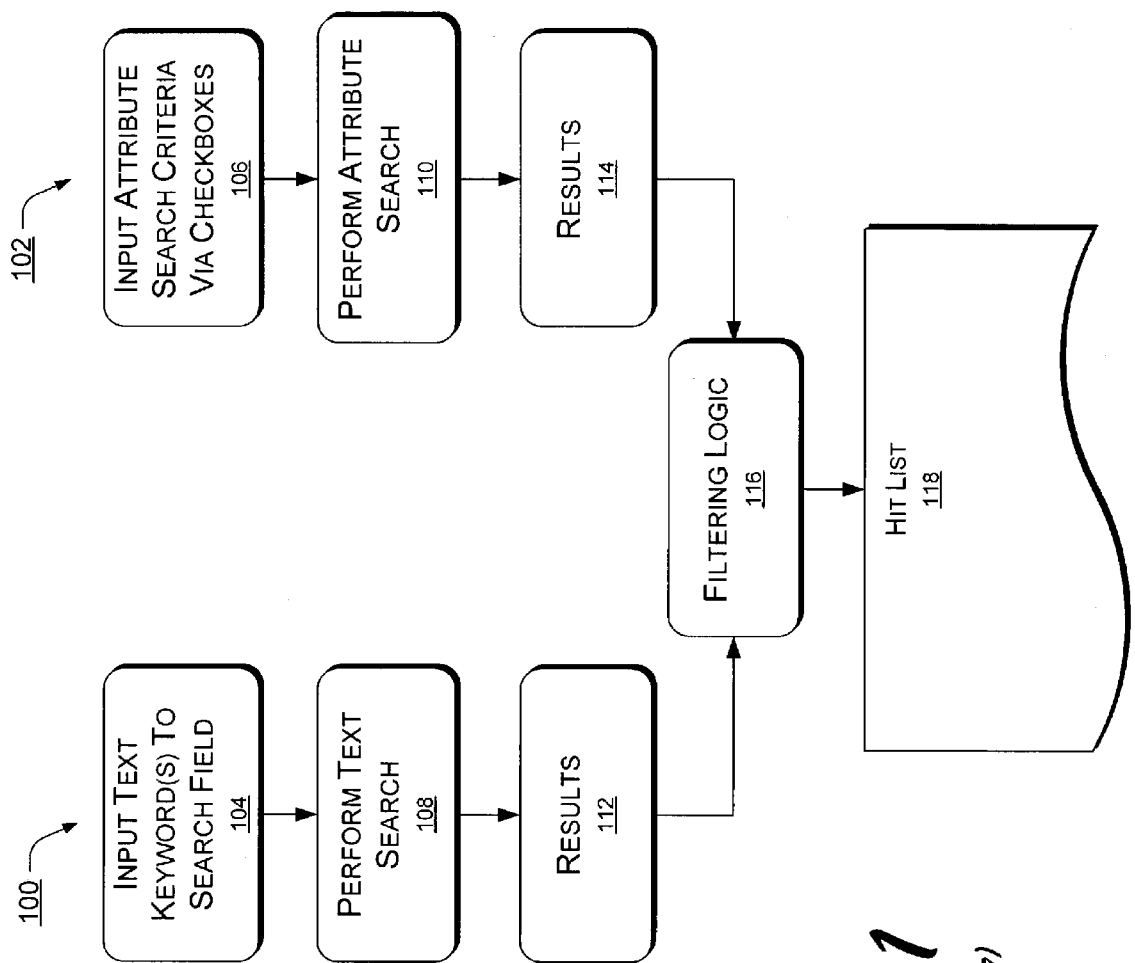
FIG. 1 is a graphic representation of prior art text and attribute searches.
Figure 2:
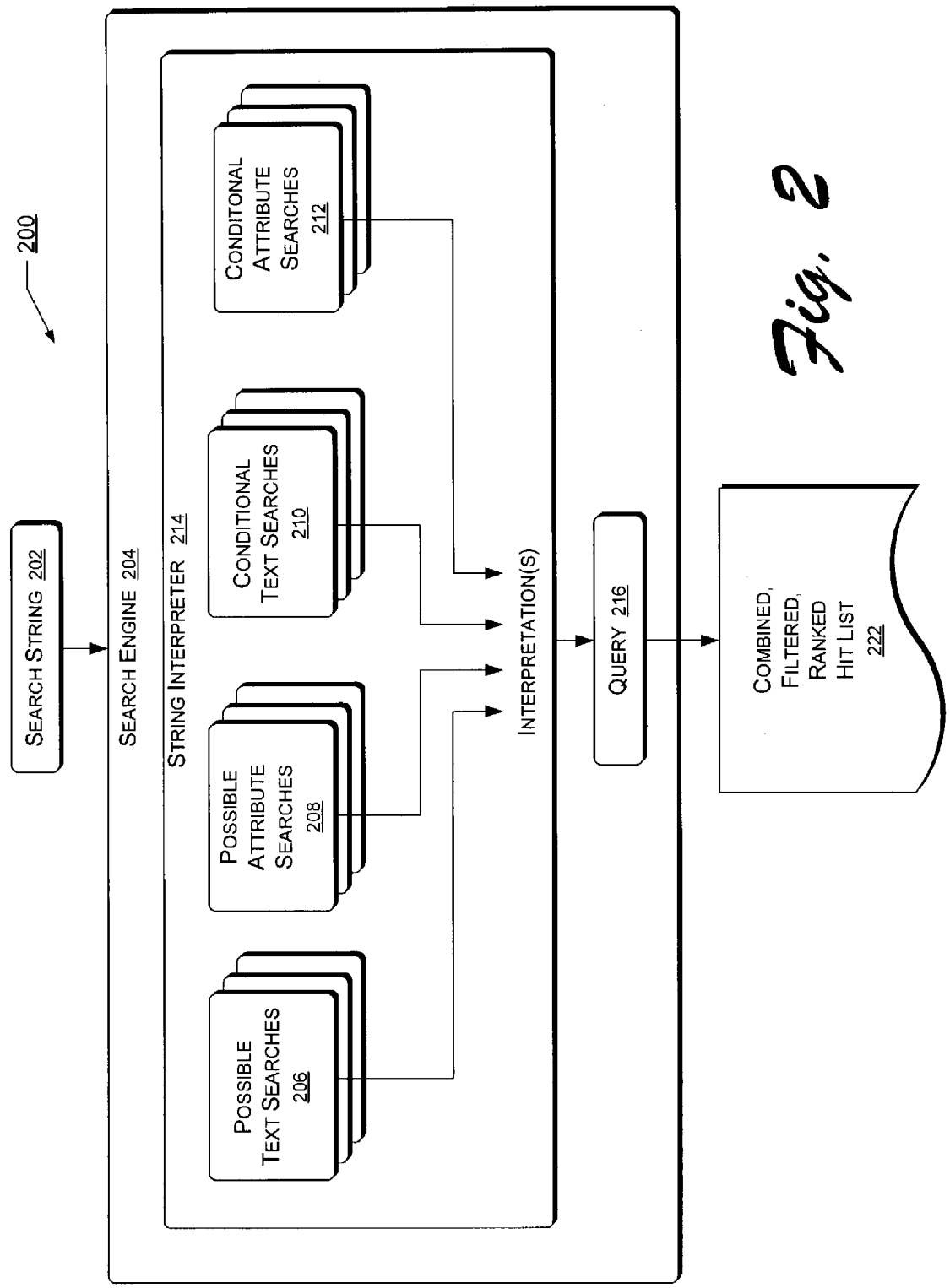
FIG. 2 is a graphic representation of an exemplary search according to the subject matter.

FIG. 2 gives an overview of an exemplary search 200 in EPG databases or other resources. The exemplary search 200 begins with a search string 202 entered by or received from a user or retrieved from storage. An exemplary search engine 204 receives the search string 202, performing several transformations on the terms of the string to generate possible query instructions of various levels of complexity.

A single search string 202 may spawn one or more independent searches, depending on the complexity and indefiniteness of the search string 202, and so accordingly in one implementation, a string interpreter 214 tries to compose as few queries (one if possible) and as restrictive queries as possible, based on the particular search string 202. For example, in one implementation the string interpreter 214 achieves this minimum number of concise and/or restrictive queries by determining which terms in the search string 202 are known attributes to be searched as attribute search terms. The remaining terms in the search string 202 may be possible attribute terms or possible text terms, but determining known attributes (e.g., using a database or list of known attributes) often narrows a query considerably. Thus, the string interpreter 214 "considers" series of text searches 206, attribute searches 208, conditional text searches 210, and conditional attribute searches 212, using various methods and resources as discussed more fully below with regard to FIG. 3.

In one implementation, a brute force determination of the likely meaning of the search string 202 is accomplished by performing a preliminary search on each normalized term in the search string 202 either in an EPG database and/or in an online dictionary and ranking results. For example, if "Ryan" is a search term, then "Saving Private Ryan" might be selected over "Ryan O'Neal" as the likely interpretation of the search if it is more common in the database or dictionary. In another implementation, the string interpreter 214 tries different combinations of the search terms until one of the combinations is found in the EPG resources being searched or is logically favored. Hence, the search terms, "moon" and "paper" occurring randomly but as the only text terms among a host of attribute terms in a search string 202 would likely result in the interpretation "Paper Moon," which would be ranked highly if actually found as a hit via a query.

The string interpreter 214 thus arrives at one or more interpretations, which result in a query 216 (or queries). The query 216 is used to perform one or more searches resulting in a combined, filtered, and/or ranked hit list 222 that is displayed for the user. This exemplary search 200 is only one example of how one or more text and attribute sensitive searches can stem from only one search string 202. The search string 202 is parsed, transformed, and analyzed, e.g., by the string interpreter 214, to achieve a text and attribute aware interpretation of the terms in the search string 202.

In one implementation, the combined, filtered, and/or ranked hit list 222 is updated as various search paths return results. Alternatively, results may progressively appear in the combined, filtered, and/or ranked hit list 222 as the search string 202 is being entered, i.e., a new and/or modified search is initiated as each character is added to the search string 202.

Exemplary Search Engine

Figure 3:
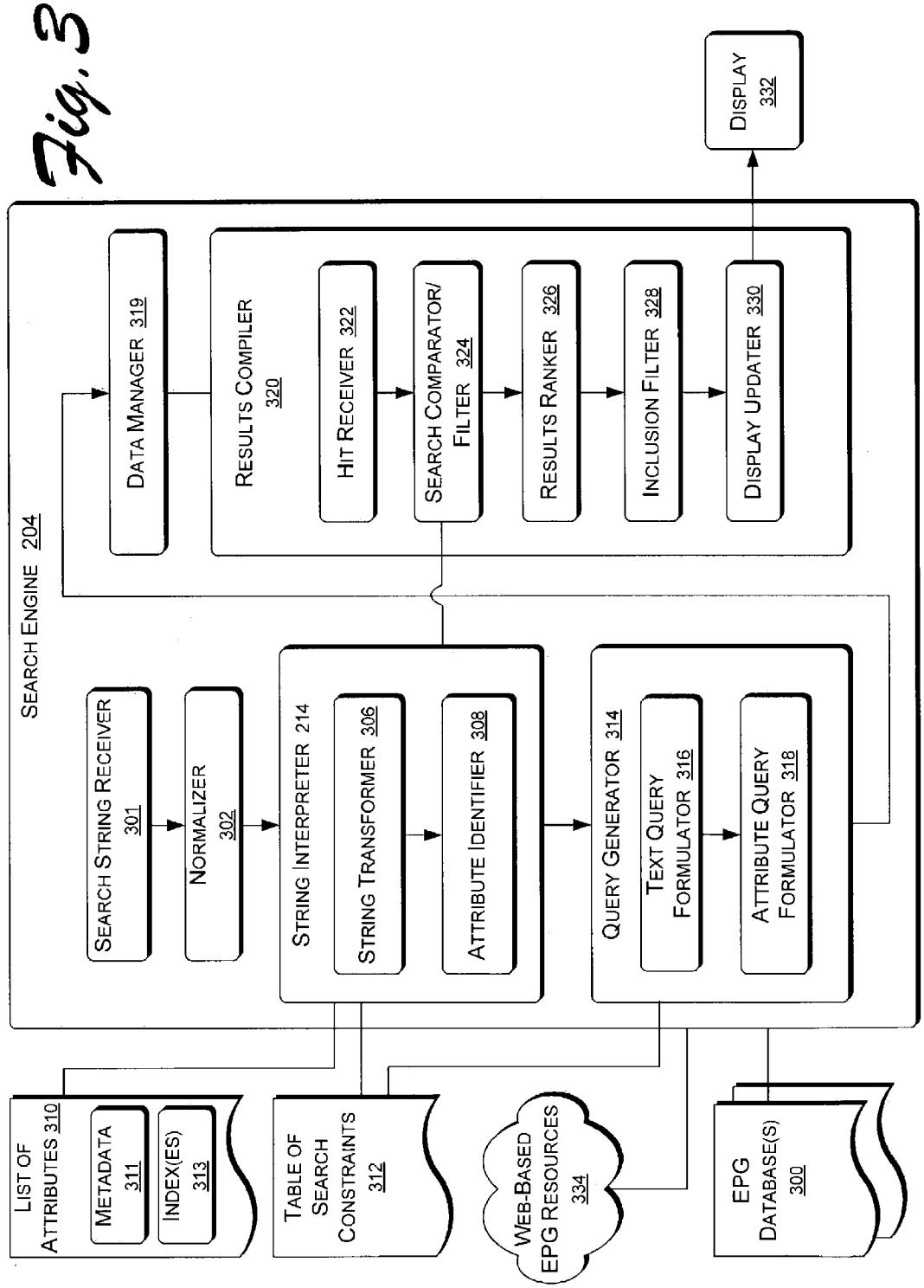
FIG. 3 is a block diagram of an exemplary search engine.

FIG. 3 shows the exemplary search engine 204 of FIG. 2 in greater detail. The exemplary search engine 204 is communicatively coupled with one or more EPG database(s) 300. Certain features and processes performed by the exemplary search engine 204 will now be described, but of course an exemplary search engine 204 may have features and perform processes that are additional to those illustrated, for example, indexing database contents. Various implementations of the exemplary search engine 204 will of course operate with various different human languages. Thus, some features of the exemplary search engine 204 may not apply or may not be needed with some languages.

In general, the exemplary search engine 204 executes the EPG database search(es) by first exposing a search string receiver 301, such as an application program interface (API), that receives search expressions and accesses a set of constraints generated either programmatically or by the user. After creating queries based partly on the constraints, the exemplary search engine 204 returns the result set.

The search string receiver 301 can accept the search string 202 via one or more UIs. UIs for EPG data searching may be optimized for either a "two-foot" or a "ten-foot" system. A two-foot system is a digital television system in which the user has the information entering capability typical of a PC system. For example, a two-foot system might use a full keyboard, mouse, and monitor. A ten-foot system, on the other hand, is a digital television system in which the user has limited inputting capability compared with a two-foot system. A ten-foot system might be the UI generated by a set-top box and a search string 202 entered using a remote control with relatively few keys to actuate.

Because data entry and navigation around a UI is generally more difficult with a ten-foot system, it is useful minimize the amount of data necessary to capture the user's intent in entering a search into the ten-foot system, while maximizing the accuracy and power of the search.

The search string receiver 301 can, of course, accept user input from any number of entry fields, checkboxes, switches, and/or devices. If the input is just a single search string 202, however, the exemplary search engine 204 can "decode" the search string to separate out text and attribute search information and construct appropriate queries.

A normalizer 302 communicatively coupled with the search string receiver 301 converts irregularities (i.e., converts the format of "non-standardized" terms) in the search string 202 into terms that can be consistently applied in the various queries. A non-standard entry is a term or a part of the search string 202 that has text, character, language, and/or punctuation formalities that do not match the formalities of the EPG database(s) 300 to be searched. A non-standard entry runs the risk of being unintelligible in part or whole to the string interpreter 304, and might result in the miss of qualifying hits when its formalities do not match the EPG database(s) 300 being searched.

As part of a search request, the search string receiver 301 is often passed a string of characters entered by the user, for example, "The West Wing". The normalizer 302, or another module of the exemplary search engine 204, may employ term separation to attempt to split the phrase into each of the words that compose it, performing a text search for each word individually. This separation into individual words has the advantage of finding matches when the user has omitted or rearranged words in a well-known title, but may also generate more hits than intended by the user. Individual word search terms are often separated at white-space and dash boundaries. The normalizer 302 may also remove extra spaces between words of a quoted phrase.

Users do not always enter a search string 202 using the correct letter casing. For example, "The West Wing" might be typed as "the west wing". Additionally, EPG database information sometimes contains non-conventional letter casing in phrases like "SUNDAY TICKET" instead of "Sunday Ticket" or "sunday ticket". The normalizer 302 may perform letter-case normalization by converting each search term and also the EPG database text being searched to a common case (either upper or lower), e.g., by following the rules of the current locale.

The normalizer 302 may also normalize certain symbols and marks. A diacritical mark is a combining character such as an accent or umlaut that may appear in many international language alphabets, usually accompanying vowels. In one implementation of the subject matter, search terms and the database text being searched are compared as if the diacritical marks were not present. Symbols and special alphabet characters can also be rewritten and/or added to search terms by the normalizer 302 to facilitate an accurate search. For example, characters such as the German esset "β" can be rewritten as "ss" so that a search containing the German esset will produce hits if either the esset form or the "ss" form are present in the text being searched.

Symbol normalization involves the removal or conversion of symbols, such as punctuation, from both the search term(s) and the text being searched for more accurate matching. For example, periods within abbreviations such as "F.B.I." and asterisks in "M*A*S*H" are be removed. Symbols such as "&" and "@" may be converted to their word forms "and" and "at". Symbols substituted for letters may be converted, e.g., the "$" sign in "Vega$". This symbol normalization may result in additional searches. For example, the exemplary search engine 204 might search for both "Vegas" and "Vega$" after the normalizer 302 has processed the search string 202, instead of using only one form by convention and normalizing both the search term and the text being search according to the one conventional form.

Articles of speech as well as ubiquitous but not very descriptive words such as "a", "the", "is", "are", "el", "la", "los", "les", etc. can be removed from the search terms by the normalizer 302 to speed processing. In some implementations, the articles and ubiquitous words are not removed or are conditionally searched for if they are the only words present in the search, or if a first pass of the search yields no results.

The exemplary search engine 204 may scan the search string in advance for tokens that alter the search meaning in some way. For instance, preceding a word with a minus-sign "−" might indicate that the word must not appear in a match. Grouping terms together as a quote might indicate that the group should only be considered when the terms in the group appear in the given order, and together. The words "AND", "OR", and "NOT" can be used in a special manner to influence search operators. This allows a user more control over a search.

In one implementation, the normalizer 302 or other components of the search engine 204, may apply spell-checking to the search string 202 as entered. Several strategies are employed to aid the user in avoiding mistakes when entering the search string 202. The user can be alerted to the possible presence of misspelled words in the search text before the search is executed either via a spelling dialog box or another text indicator, such as the "wavy-line" INTELLISENSE® highlight. Alternatively, spell-checking can be deferred to the end of search execution and performed only if no exact results are found. Lastly, spell-checking can be performed transparently. Corrected forms of words interpreted by the normalizer 302 to be misspelled can be automatically appended to the search string 202 and queried as conditional searches. Relevancy ranking (to be discussed below) can then be used to lower the rank of these conditional search terms if the searches yield hits that actually contain the misspelled search terms.

The normalizer 302 can also use auto-correct, which is a simplified form of spell-checking. Instead of comparing each search term to a dictionary, words are corrected as they are typed using a simple lookup table of commonly misspelled words. In rare cases in which auto-correct makes the wrong decision (correcting a word the user intentionally meant to "misspell"), the user can backspace once to undo the automatic correction. As a user types, a pop-up list of possible word completions can also be presented by the normalizer 302 based upon a pre-existing full-text index. This allows the user to enter search criteria more quickly.

A string interpreter 304 is communicatively coupled with the normalizer 302. In one implementation, the string interpreter 304 includes a string transformer 306 and an attribute identifier 308 communicatively coupled with a list of attributes 310. The string interpreter 304 may also be communicatively coupled with a table of search constraints 312.

The string transformer 306 may test the search terms in a search string 202 either singly or in combination to achieve an interpretation for the search string 202 and to determine if the string should be rearranged. The string transformer 306 may use a rearrangement and/or scrambling scheme to try combinations of the various terms within the search string 202, and in various orders to identify possible attributes for which the user was trying to search. Thus, "dolby the closed mile green captioning" might yield search term candidates including "dolby," "the Green Mile," and "closed captioning." If it appears two or more of the terms should be grouped together, the string transformer may transpose the terms and/or transparently add the posited group to the search terms in the search string 202. To accomplish this, the string transformer 306 may test the search terms against the list of attributes 310 and/or the table of search constraints 312.

The string transformer 306 may stem a search term to broaden the scope of a search. "Stemming" is a process of removing prefixes and/or suffixes from a search term to allow the root of the search term to proxy for the original search term. This produces more hits capturing more variants of the original search term. For example, the word "divine" can be stemmed to "divin" so that it matches "divinity," "divination", "diviner", "divinity," etc. The string transformer 306 may use a known stemming algorithm such as the "Porter" algorithm. Stemming has the advantage of generating hits that might have been missed if the search term was queried exactly, but has the disadvantage of often generating irrelevant hits. This effect can be decreased by using a relevance ranker, either in the string transformer 306 or in another part of the exemplary search engine 204, such as a results compiler (described below). In some implementations, stemming requires a data preprocessing step that can cause a decrease in search speed. Hence, in some implementations, stemming is limited to special words, e.g., rare words as determined by a frequency of occurrence index.

The string transformer 306 may perform additional term and string transformations. Word branching involves generating a set of search terms from a single term. A list of related words may be used. For example, the search term "NFL" might result in the term "football" being appended to the search string 202, and thus "NFL" might spawn an additional search for "football". The term "thirty" might be added to the search string 202 if the term "30" appears in the search string 202, etc. The related terms can come from an exception list relevant to the data being searched, and/or an exception list stored in the user-defined or programmatically determined table of constraints 312. Word branching may also slow down searches and may generate irrelevant results, but it will also generate hits in some cases where none would have been found. A relevance ranker can be used to place less relevant results at the bottom of the hit list 222.

Pluralizing may also be used. Pluralizing is a simple form of word stemming that generates additional search terms based on the singular or plural form of the original word. For example, if the search term is "baby", an additional search term of "babies" can be included.

Optionally, the string interpreter 304 or another component of the search engine 204, may add natural language parsing to the other string interpretation features and processes. This type of parsing includes converting a search phrase such as "When is Star Wars shown in Dolby-Digital?" into workable search terms that meet the users' search request. Though natural language parsing is very powerful, the grammar is generally limited to the user's choice of noun/verb meanings. Additionally, given the increased number of words in the natural language search string 202 (relative to a Boolean term search), the natural language search may not be the optimal choice for a ten-foot system in which search terms have to be entered using a remote control keypad. Lastly, natural language parsing can require more processing power to implement.

The features and processes performed by the string transformer 306 and by the other modules of the exemplary search engine 204 are described in a certain order, but the order in which these features and processes are presented is not meant to indicate a suggested order of use through a processing pipeline. In many cases, the ordering and/or the performance of each of these features and processes is important to the results generated.

The attribute identifier 308 separates text search terms from attribute search terms by various methods, such as comparing candidate or potential search terms to attributes in the list of attributes 310. The attribute identifier 308 may also receive feedback from text search results and apply the process of elimination to terms in the search string 202 to thereby find attributes. In this case, the attribute identifier 308 may postulate various Boolean relationships between search terms. For example, the search terms "green mile dolby" might be interpreted as "'green' OR 'mile' AND dolby" or, "'green mile' AND dolby" but might spawn a search that returns only instances of the show "The Green Mile" in DOLBY® digital or DOLBY® Stereo sound because of the second set of postulated Boolean relationships.

The list of attributes 310, of course, may be stored in computer memory for fast string interpretation. If a list of approximately two-hundred television programming attributes is used in the list of attributes 310, then perhaps virtually all attributes relevant to television programming that would be entered by a user can be identified by the attribute identifier 308 and separated from text search terms.

A representation of an exemplary list of attributes 310 cast as an exemplary extensible markup language (XML) data structure appears in Appendix A: "Exemplary List of Attributes". This representation contains only a sample selection of television programming attributes, elements, and values. Accordingly, a typical list of attributes 310 can contain more or less entries than those shown, and/or different elements, attributes and/or values.

As demonstrated by the XML version of an exemplary list of attributes 310 in Appendix A, the list of attributes 310 need not be limited to a sequential array of attribute elements that provides only a true/false or "does-exist/does-not-exist" match when presented with an attribute search term candidate. The list of attributes 310 may contain metadata 311 for at least some of the attributes, wherein the metadata of an attribute relates the attribute to search resources and to values to use in the search. The metadata 311 may also relate the attribute to a set of logical search conditions in the table of constraints 312. In addition, the list of attributes 310 may contain index(es) 313 to relate an attribute in the list of attributes 310 to other related attributes and values that can be reasonably searched to produce hits conforming to the search string 202.

In some implementations, the index(es) 313 and/or the metadata 311 may contain relatively complex branching logic and/or a tree structure of logical search conditions that may generate hits that conform to the user's intent in constructing the search string 202. For example, if the attribute identifier 308 checks the list of attributes 310 for the search term "stereo," a match may be found designating the proper name of the attribute and/or designating search fields in the EPG information likely to contain the stereo attributes of programs, e.g., "stereo" programs can be found by looking in the "ScheduleEntryAttribute" fields of database records. Further, having found that the candidate search term fits the criteria of an attribute, and having designated search fields in the EPG data, the list of attributes 310 may also yield one or more exact values, e.g., "MSEPGA_STEREO", that may represent a search term, key, or category with which (or in which) to find stereo programs.

The indexing capability of the list of attributes 310 can be multi-branched. For example, if the attribute identifier 308 checks the list of attributes 310 for the candidate search term "sports", the list of attributes 310 may identify "sports" as an attribute, further identify it as a "category" type of attribute, and direct the attribute identifier 308 to cross-check three other categories for relevant programs: "news", "specials", and "MSEPGC_SPORTS".

By deploying the features and processes described above for the string transformer 306 and by identifying attributes and related metadata via the list of attributes 310, the string interpreter 304 achieves a set of search terms that try to approximate the user's intent in constructing the search string 202. In other words, the string interpreter 304 achieves a set of text search terms and attribute search terms that have a high probability of returning hits that match what most users would be looking for if they had constructed the search string 202. For example, if the user constructs the search string "scifi dolby letterbox", the exemplary search engine 204 might return a hit list 222 of science fiction shows being shown in DOLBY® Stereo sound in letterbox. If the user constructs the search string "primetime network comedies", the exemplary search engine 204 might return a hit list 222 of primetime comedy shows on network stations. If the user constructs the search string "drama rated pg", the exemplary search engine 204 might return a hit list 222 of drama shows with a PG rating. If the user constructs the search string "Discovery", the exemplary search engine 204 might return a hit list 222 both of shows with "discovery" in the title and of channels with "discovery" in the name of the channel, e.g., the "DISCOVERY CHANNEL®".

A query generator 314 is communicatively coupled with the string interpreter 304. The query generator 314 may include a text query formulator 316 and an attribute query formulator 318. In one implementation, the text query formulator 316 and the attribute query formulator 318 compose as few (often just one) and as restrictive a query or queries as possible for search in the EPG database(s) 300 and web-based EPG resources 334. If multiple queries are composed, then the results can be combined.

For each search term that is received from the string interpreter 304, the query generator 314 can apply an operator that affects the way in which a match is found during a query of the EPG database(s) 300 or web-based EPG resources 334. In one implementation, each operator specifies a position or configuration in which the search term must (or must not) be found in the text being searched. A few exemplary operators will now be described. An "exact" operator specifies that the search term should exactly match a given portion of the text being searched, i.e., if the query generator 314 is searching a certain type of field, the search term would have to match the field exactly. A "starts-with (phrase)" operator specifies that the search term should be found at the beginning of the field of text being searched. A "starts-with (word)" operator specifies that the search term should be the beginning of a word within the field of text being searched. A "contains" operator specifies that the search term can be found anywhere in the field of text being searched.

For each of the above-described operators, a "counter-operator" (the NOT form) can be used to specify that a hit should not be generated by the search engine 204 if the respective condition is true. Search operators "AND" and "OR" can also be used to specify whether all search terms must be found in the field of text being searched or if only some of the search terms must match.

The data manager 319 uses the various search terms produced by the query generator 314 to perform searches in the EPG database(s) 300. In some implementations of the subject matter, the data manager 319 may be or may employ an SQL (structured query language) database engine or a JET database engine, and if so, may combine some of the functions of the results compiler 320. Hence, the data manager 319 may internally run multiple search paths and combine them. Accordingly, the EPG database(s) 300 may assume a number of different formats (e.g., XML, binary, JET, SQL, etc.), some more suitable for storage and some more suitable for transmittal across networks. Depending on the constraints of the transmission medium, the optimal format for transmission may be different than the optimal format for storage and/or searching. Several of these format choices and their relative strengths and weaknesses will now be discussed.

Some guide services transmit a multi-day guide to clients using XML that is formatted to match a defined schema. XML is a convenient format to work with because it is easy to understand, human-readable, and possesses a large number of existing tools. XML is not, however, a very compact format. For this reason, the eHome guide is compressed into a CAB file before being transmitted and then decompressed after reception is complete.

Large XML files are not easily searched. For example, a ten day amount of EPG data can fill a 6.6 megabyte file. Loading an XML file this size into a document object model (DOM) requires almost ninety megabytes of random access memory. Scanning such a large file during each search is impractical. For these reasons, the XML format may be used mainly for transmission and persistent storage. When many clients load the EPG data file, the non-textual data is stored in memory and all text-based data is written to a memory-mapped file for searching. Some EPG data APIs may have to implement a custom database to accommodate changes in data and/or search patterns.

Another choice for the EPG database(s) 300 is a binary format. Though binary formats are often very compact, they generally rely on custom tools to generate and browse them. Like XML files, binary files are not usually optimal for searching and can require an alternative intermediate storage format for this purpose.

The search engine 204 may also use the Jet database engine, which is well-supported with database tools, to query the EPG database(s) 300. A redistributable API called MDAC provides rich APIs for creating and querying Jet databases using SQL, ADO, or OLE DB. One advantage of using a Jet database for the EPG database(s) 300 is easy searching using industry standard SQL commands and easy viewing using common software. The performance of searches using Jet are generally faster than many other methods (one exception is SQL Server) as long as indexes are appropriately generated and stored. Jet databases are also stored in a single file facilitating manipulation of entire EPG database(s) 300.

Like the Jet database engine, SQL is a well-supported database platform for EPG database(s) 300 with a large library of tools and APIs. Although a current well-known version of SQL Server runs only on server machines, a version of SQL Server called MSDE (or the SQL Desktop Edition) can be installed on many current operating system software versions. Searching a well-indexed SQL database is probably faster and more flexible than other known data search techniques. SQL databases, however, are not easily transmitted across a network. A post-processing step of loading EPG data into the SQL database from another format would be required to use MSDE. Also, unlike the server version, MSDE may not always support a natural language search or full-text indexing (though both could be emulated using other methods).

It should be noted that in many cases, the native format of the EPG database(s) 300 may not be in the final form required by the exemplary search engine 204. For example, data indexes might need to be generated or data might need to be read into an alternative database that is optimized for searching but difficult to transmit across a network. In one implementation, the exemplary search engine 204 even discards unwanted data and merges user-specific data for faster searching.

If data indexes are used, the search engine 204 may implement full-text indexing. This involves generating a reverse word index into each element of text-based EPG data. Full-text indexing greatly increases the performance of searches at the expense of larger EPG database(s) 300 and increased time for the index generation.

The search engine 204 may also use signature indexing. Like full-text indexing, signature indexing is a method of quickly identifying possible search matches. In the EPG database(s) 300, each data row (program, channel, etc.) has a binary signature similar to a hash that indicates which letters occur in each word. Performing the similar computations on the search term and a word from the text being searched, then matching the results using binary arithmetic, allows a quick approximation of whether the word matches the search term. A second, more processor intensive search may then be needed to determine whether the row containing the matched word should generate a hit.

As mentioned in passing above, the subject matter is not limited by the ability of the search engine 204 to derive text search terms and attribute search terms from a single search string 202. An exemplary search engine 204 may derive search terms from multiple sources, such as various entry fields in a UI in addition to deriving text search terms and attribute search terms from the single search string 202. For example, in some products, attributes such as "stereo", "closed captioning", "start time", and "year of release" are often available as search terms but are entered in some UI's via checkboxes, radio buttons, etc. These can also be accommodated by the exemplary search engine 204 by being passed to the search API as search terms. This accommodation does not limit the search engine 204 from deriving other attribute search terms and text search terms from a single search string 202.

The exemplary search engine 204 can prompt the user to choose fields that the user wishes to search on. So in addition to automatically searching across all domains (e.g., title, description, channels, cast, etc.) and ranking hits by their predicted relevance, the exemplary search engine 204 can also allow the user to manually narrow down the fields and/or search domains.

The exemplary search engine 204 also includes a results compiler 320 communicatively coupled with the data manager 319 and the string interpreter 304. A hit receiver 322 in the results compiler 320 collects hits from the various search modalities or from a single search modality searching in multiple databases. Because multiple searches may be transpiring simultaneously, the hit receiver may comprise a receiving manifold or a buffer that can store hits temporarily pending further compilation.

In the exemplary search engine 204, a search comparator/filter 324 is communicatively coupled with the hit receiver 322 and with the string interpreter 304. The search comparator/filter 324 tests hits against the string interpretation set up by the string interpreter 304. As discussed above, the string interpreter 304 achieves a working hypothesis, or interpretation, of the user's intent in constructing the search string 202 via the string transformer 306 and the attribute identifier 308. In the results compiler 320, if a hit does not agree with the interpretation, the hit may be filtered, that is, eliminated from the displayed hit list 222 or demoted for purposes of ranking in the displayed hit list 222. In one implementation, the search comparator/filter 324 scans the result set one-by-one to determine whether each result is really a hit. This is more likely if a query could not be factored to a fine enough level to exclude all misses while still including all hits. As an example of interpretation, if the original search string 202 is "duck dolby" and the string interpreter 304 favors the interpretation "Howard the Duck, by Thomas Dolby" over the interpretation "Donald Duck in Dolby Digital" then the Donald Duck hit might be eliminated completely from the list of hits 222 or at least given a lower rank.

A results ranker 326 may organize hits for display by relevance or other criteria, either when all the searches are finished or, in some implementations, as the results are received piecemeal by the hit receiver 322 and passed down through the search comparator/filter 324. The hits generated by the search engine 204 can often be ranked so that hit results can be sorted for display in such a way as to present the most likely results first, i.e., hits that are closest to the interpretation of the user's intent in constructing the search string 202 (as hypothesized by the string interpreter 304). Exact matches of each search term, for instance, may be afforded a relevancy ranking of 100% and given top priority. Hits that only match the text to be searched after some transformation such as stemming or spell-correcting are usually given a lower relevancy.

An inclusion filter 328 may be communicatively coupled with the results ranker 326. In some variations, the inclusion filter 328 can be programmatically set to filter in a certain manner while in other variations the inclusion filter 328 can be adjusted by the user. For example, the inclusion filter 328 may be set or adjusted to entirely exclude any hit results that are less than 100% relevant when at least one 100% relevant hit is found. In other cases, the inclusion filter 328 can be set or adjusted to truncate a long list of results, displaying only a certain number of the top results despite some of the results having 100% relevancy. In still other cases, the inclusion filter 328 may only allow display of hit results that have a rank assigned above a certain percentile. Hence, if the search is for the movie "Where the Red Fern Grows" and the only hit is "The Red Skelton Hour" with a relevancy ranking of only 15%, then the inclusion filter 328 might display "no results found."

The inclusion filter 328 may also restrict the number of results to a defined value, and/or restrict the results depending on parental control and/or the user conducting the search. In a recording context, the inclusion filter 328 may eliminate results that will not have a showing in the future.

A display updater 330 is included in the results compiler 320 to control the display 332 on which the hit list 222 is presented to the user. There are many possible ways to present the hit list 222 of search results. The hits can be displayed alphabetically or chronologically. Results can also be grouped and ranked by relevance. In some implementations the display updater 330 may be a clearinghouse for results, that is, the display updater 330 may keep a tally of what is being displayed. If hit results are received piecemeal, then the display updater 330 may perform an integrating function of combining old results with new results and deciding which results to display. During a piecemeal search, the display updater 330 may section the display to show the order in which groups of search results are received and/or may also section the display to show which hits are related to which search terms. During a progressive search (to be discussed more fully below), the display updater 330 may discard all or most of the displayed results every time the user adds (e.g., types and/or enters) a new alphanumeric character onto the search string 202. Thus, in a progressive search, the display updater 330 reconfigures the search results from scratch as the meaning of the search string 202 being entered develops.

Of course, in some implementations, the various modules of the results compiler 320 may be combined together or ordered differently. In variations, some of the modules might be eliminated or other conventional databasing modules might be added.

Variations of the exemplary search engine 204 can be adapted to suit the speed and processing power of the available hardware and/or software environment used in implementation. A search may take longer to execute than is acceptable to the user. The search engine 204 may asynchronously return hits as they are found while the search(es) are still executing. Alternatively, an exemplary search engine 204 can intelligently divide the search into pieces, updating the result set periodically until the search has completed. For example, a text search for an exact word match might be performed (and the results returned) before stemming and normalization functions are applied and returned in a subsequent pass. Searches can also be broken up in time, searching programs in groups divided according to scheduled air times.

In another option, if additional data stores are available to the exemplary search engine 204, the search domain can be enlarged. The search engine 204 might execute searches across each data store, merging the results before finalizing the result set. This can be used, for example, to combine the search of local EPG database(s) 300 with the search of the web-based EPG resources 334. Additionally, programs prerecorded on a local medium can also be added to the search domain. Such searches can be executed through multiple APIs and merged before display.

The exemplary search engine 204 can also persist search criteria for later and/or background execution. Users may be interested in creating a search that can be recalled without reentering the search string 202. It is also useful to keep track of which hits a user has already reviewed so that, in some implementations, some results may be hidden, separated, or "grayed out" for easier perusal. Persistent searches could be run each time the EPG database(s) 300 information is updated so that the user can be informed of upcoming events they are interested in.

The search criteria can be serialized, for example into macros, and act as a serialization mechanism for defining automatic records, i.e., history-lists of searches. Tokens can also be assigned to each serialization of search terms, so that the user can select the serialization by electing the token. A serialized search can be exchanged to other users via email, web links, and/or embedded in a TV broadcast for "click to record" links. The exemplary search engine 204 can also define one or more serialization formats. The search and/or serialization can be stored in a binary form for compact storage or cast in an ASCII form for easy transmittal via email. The serialization can be used singly or in conjunction with automatic recording, in which the user defines a search and indicates that all future shows (minus duplicate instances) that match the search criteria are to be recorded.

Exemplary Search

Figure 4:
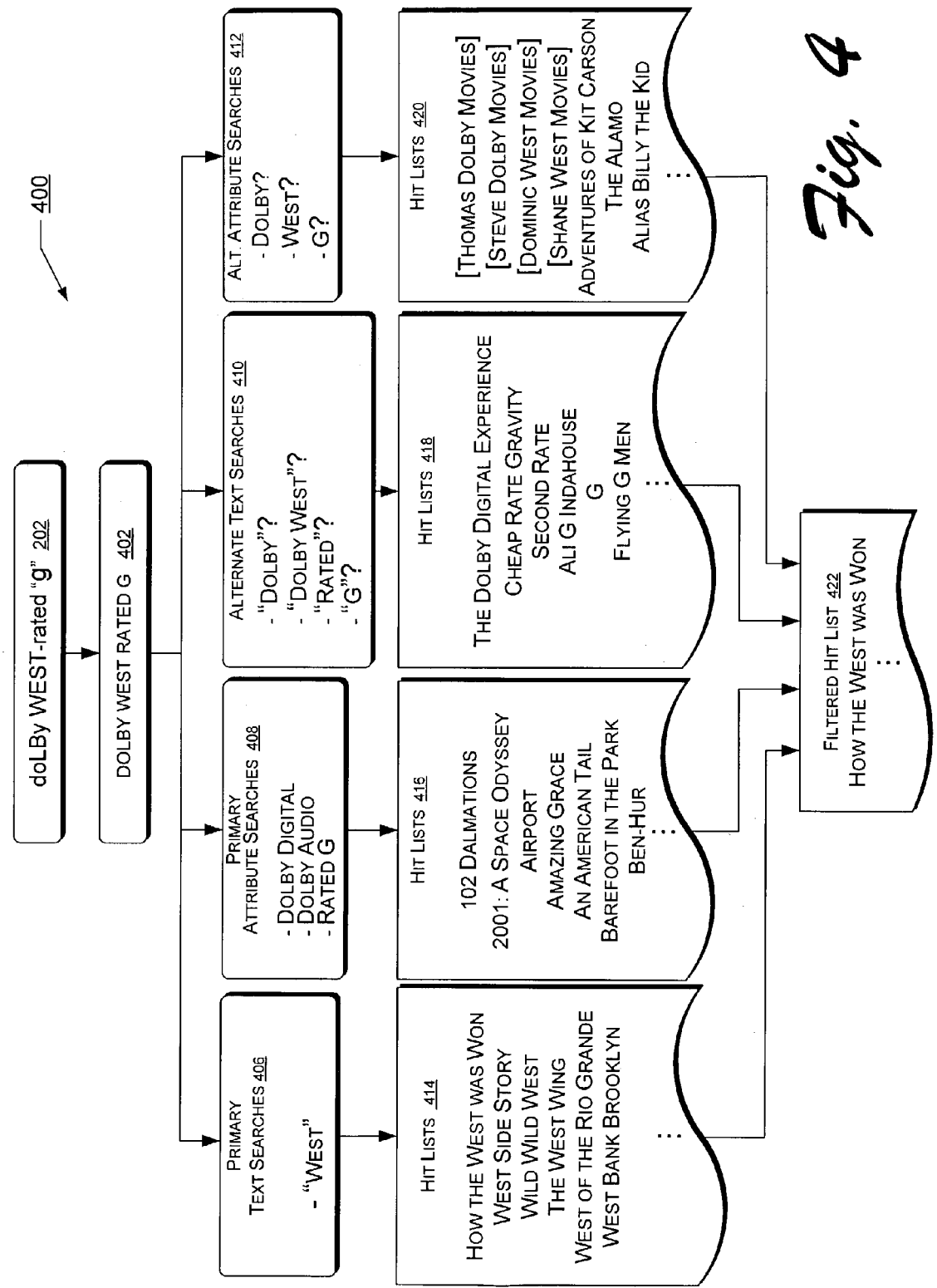
FIG. 4 is a graphic representation of an exemplary search performed by the exemplary search engine of FIG. 3.

FIG. 4 shows an exemplary search 400 according to the subject matter, which may be accomplished by a search engine, such as the exemplary search engine 204. A relatively indefinite search string 202, such as "doLBy WEST-rated 'g'" is received from a user or from persistent storage via the exemplary search engine 204. This search string 202 may not be restrictable to a single concise query. The exemplary search engine 204, however, possesses great versatility to execute multiple searches to find likely hits. The exemplary normalizer 302 transforms the string into an exemplary standardized form, i.e, a normalized search string 402: "DOLBY WEST RATED G." In this case, the normalizer 302 has changed the letter case of some of the letters in "doLBy" to achieve a text search term that will match the case of the text to be searched in, e.g., in the EPG database(s) 300. The normalizer 302 separates search terms using the white spaces between words and the dash between "WEST" and "rated" as boundaries. The normalizer 302 has removed the quotation marks from around "g" and has placed the entire string of search terms into one case, i.e., capital letters.

The normalized search string 402 is passed to the exemplary string interpreter 304, which may arrive at a fairly conclusive interpretation of the user's intent in constructing the search string 202. A fairly conclusive interpretation can be achieved if attribute search terms entered by the user are clearly delineable from text search terms via, e.g., the list of attributes 310. The string interpreter 304 may not be able to achieve a conclusive separation between text and attribute terms, however, in which case the string interpreter 304 may pass search terms to the query generator 314 for alternate and/or conditional searches. That is, if there is ambiguity about a certain term the term may be used in a text search and also in an attribute search to see, e.g., how many hits result from each type of search. Hence, the search term "DOLBY" may be a word in a program title, such as "The Dolby Digital Experience;" it may be a program creator attribute, such as "Thomas Dolby;" and it may be a program qualitative attribute, such as "DOLBY® digital." The exemplary query generator 314 may test each of these possibilities: as two attribute searches 406 (DOLBY® digital and DOLBY® Stereo sound), as an alternate text search 410 ("dolby" as a term in a program title), and as an alternate attribute search (cast and crew with the name "Dolby"). The query generator 314 may decide not, to search "DOLBY" as a primary text search 406, since the relevancy ranking of "DOLBY" as an attribute is very high. However, if "DOLBY" can be found in a text search then it will be discovered by the alternate text search 410. Hence, alternate or conditional searches can be used as backup in case no hits are returned by searches with higher priority and/or, the alternate searches 410, 412 can be used as feelers or modifiers to gain more information about the search string 202, i.e., to strengthen an interpretation of the search string 202 or to seek out new search avenues.

The search term "WEST" from the normalized search string 402 might also be used in an alternate attribute search 412, as "WEST" can be a word from a program title, or in some schemes can be a person attribute associated with the program. If "WEST" is not found in a scan of the list of attributes 310 by the string interpreter 304, however, the string interpreter 304 may form a strong presumption that "WEST" should be a primary text term for a search of program titles.

The string interpreter 304 detects that the search term "RATED" precedes the search term "G," so the two terms are likely to be interpreted as "RATED G" and searched accordingly. Although the single term "RATED" can be queried in an alternate text search 410 (i.e., a program with the word "rated" in the title) such an alternate search is likely to be given a low relevancy ranking when "RATED" and "G" are found together in the search string 202 in the proper order of a well-known attribute.

The query generator 314 and/or the search engine 204 proceed with the various text searches 406, attribute searches 408, alternate text searches 410, and alternate attribute searches 412. The number of searches that can be performed simultaneously or in logical order as dictated by the length and meaning of the search string 202, is not limited. In some cases, the exemplary search engine 204 performs all the searches and lists the results according to relevancy after a "first pass" through all the searches. In other cases, the exemplary search engine 204 follows a tree of logical conditions set up by the string interpreter 304 or the query generator 314. For example, the logical conditions might be "if the text searches 406 yield A, then proceed with the attribute searches 408 and an alternate text search 410 using the search term X, but if the text searches 406 yield B, then proceed with three alternate attribute searches 412." The logic may further stipulate that A is a quantity of hits and B is a particular hit containing a particular text match.

Each type of search may return an intermediate hit list having the results of that particular search. The text searches hit lists 414 on the search term "WEST" may contain program titles, such as "How the West was Won," "West Side Story," "The Wild Wild West," "The West Wing," etc. With a relatively vague single search term such as "WEST," the query generator 314 most likely uses a general "in-string" operator to find any program titles containing the word "WEST."

The attribute searches hit lists 415 may contain or attempt to return a large body of program titles having attributes of "DOLBY® Stereo sound," "DOLBY® digital," and "rated G." Knowing that these attributes are rather ubiquitous, the query generator 314 may forego such attribute searches 408 on general attributes and instead include the attributes as conditions and/or filters during the text searches 406. In other words, a text search (406) hit that contains the search term "WEST" may be disallowed if it is not also associated with at least one Dolby attribute and a "G" rating.

Since the text searches 406 for "WEST" result in a large number of diverse hits, the search engine 204 is likely to perform the alternate text searches 410 for "DOLBY," "RATED," and "G" and perhaps perform a count of hits for each to gather further information. Perhaps if there were a program entitled "Dolby West," the search engine 204 would change its initial interpretation in light of the exact title match—adjacent search terms that the search engine 204 initially assumed were a mixture of text and attribute search terms.

The alternate attribute searches 412 may turn up additional results, e.g., in schemes that use cast and crew names as attributes. Hence, the alternate attribute search terms "DOLBY" and "WEST" have turned up four categories: Thomas Dolby movies, Steve Dolby movies, Dominic West movies, and Shane West movies. The alternate attribute search term "G" has also turned up the large body of program titles associated with a "G" rating but this may be filtered out because of its size or because this search is already covered in the primary attribute searches 408.

Finally, all the hit lists 414, 416, 418, 420 from the various searches 406, 408, 410, 412 are processed by the results compiler 320. The search comparator/filter 324 may compare the hits received to the interpretation of the search string 202 set up by the string interpreter 304. The results ranker 326 may give the each hit a relevancy ranking. The inclusion filter 328 may eliminate cumulative, low ranking, and/or overflow hits (too many), as well as those hits that do not fit the interpretation of the search string 202. In the illustrated filtered hit list 422, if the string interpreter 304 previously determined a Boolean relationship between the search terms, i.e., achieved an interpretation of the search string 202 that the program title should include the term "WEST" AND that the program should be in DOLBY® digital AND be rated "G," only "How the West was Won" and a relatively few other program titles will be displayed. Of course, if the interpretation achieved by the exemplary search engine 204 is not close to the user's intent (as evidenced by a lack of useful results as determined by the user), the user can always modify the search, especially since in many implementations the whole process may happen almost instantly.

Exemplary Progressive Search

Figure 5:
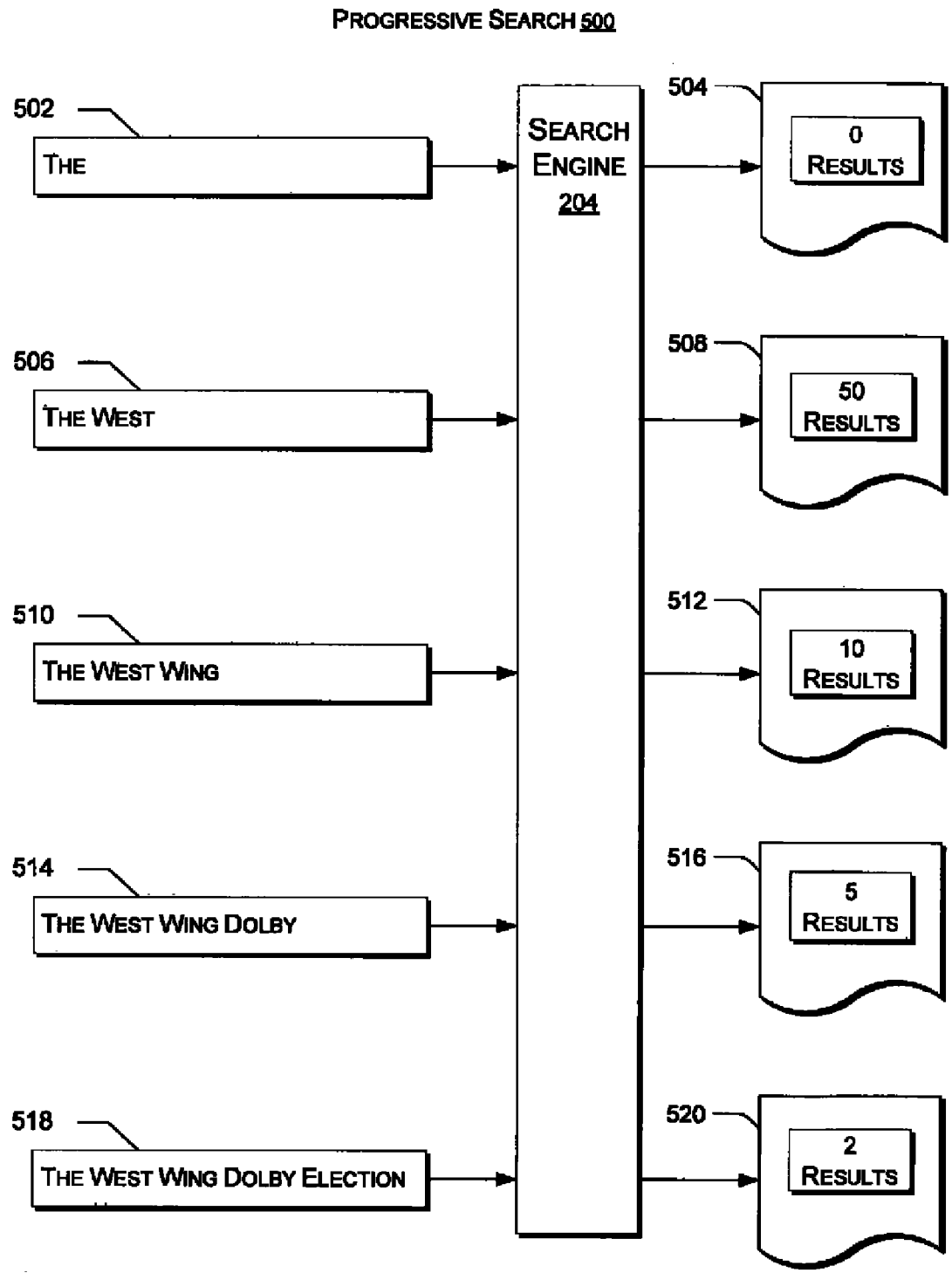
FIG. 5 is a graphic representation of an exemplary progressive search performed by the exemplary search engine of FIG. 3.

FIG. 5 shows an exemplary progressive search according to the subject matter. Because hardware and/or software available to build the modules of a search engine, such as the exemplary search engine 204, is powerful enough to provide great search speed, it is possible in one implementation of an exemplary search engine 204 to perform progressive searches.

In a progressive search, the search results are dynamically updated as fast as the results can be generated as the user types or enters characters into the UI. A new batch of searches is started after each character is entered (or removed). In a non-progressive search, the user is required to start the search manually by actuating an "Enter" key and/or indicating in some other manner that the search string 202 is complete.

FIG. 5 shows five snapshots of the search string 202 "The West Wing Dolby Election" during its entry for search in EPG database(s) 300 that have a few weeks worth of EPG information and a collection of locally recorded programs on the local hard drive of a digital video recording system. At block 502, the word "The" has been entered and the exemplary search engine 204 has posted zero results 504. This may be because the normalizer 302 has recognized "The" as an article of speech and has suppressed searches that are based on just the article. However, when the "T" of "The" was entered, a very fast system might have returned programs with an isolated "T" in the program title, e.g., "Mr. T."

At block 506, the words "The West" have now been entered and the exemplary search engine 204 has returned fifty results 508, including such titles as "The West Wing," "How the West was Won," etc.

At block 510, the words "The West Wing" have now been entered, narrowing the number of hits from fifty to ten results 512. At this point, the program title is probably certain, and the ten results probably consist of TV and movies episodes of "The West Wing" each having their own program ID number.

At block 514, the words "The West Wing Dolby" have been entered, and the qualifying hits are further narrowed to five results 516. Those episodes of the previous ten that are not in DOLBY® digital or have some other Dolby attribute are eliminated.

At block 518, the words "The West Wing Dolby Election" have been entered. This yields only two results 520. The two hits consist of those episodes of the "The West Wing" that have a "Dolby" attribute and that have an "Election" attribute, perhaps as a word in the description field for the episode.

Since the various hit results are displayed as the search string 202 is being entered, perhaps the desired episode of "The West Wing" would have appeared on the display 332 early in the process, for example when only the words "The West" at block 506 had been entered, and the user would have been immediately able to highlight and select the desired episode.

Exemplary Methods

Figure 6:
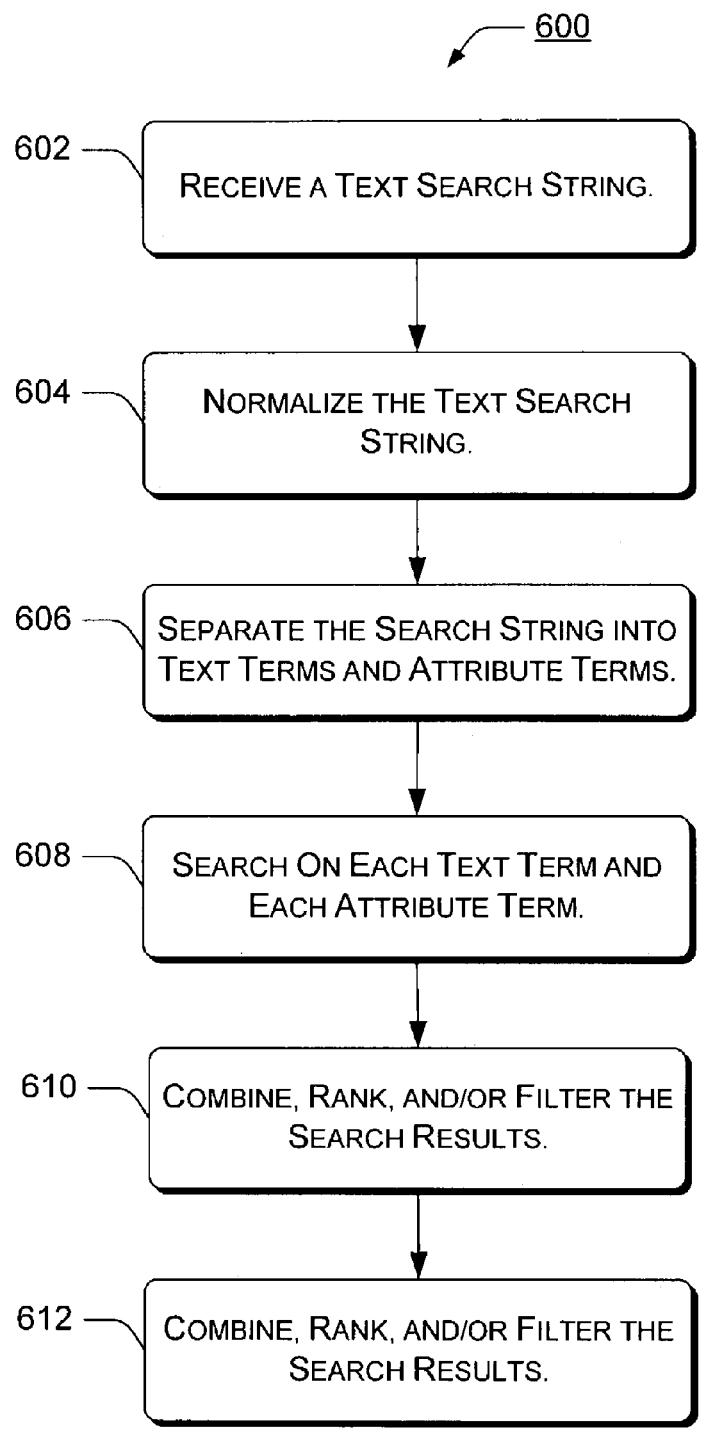
FIG. 6 is a flow diagram of an exemplary method according to the subject matter.

FIG. 6 shows an exemplary method 600 of performing a free text and attribute search according to the subject matter. This method 600 can be performed by a module, such as the exemplary search engine 204 shown in FIGS. 2, 3, and 5. In the flow diagram, the operations are summarized in individual blocks. The operations may be performed in hardware and/or as machine-readable instructions (software or firmware) that can be executed by a processor.

At block 602, a search string is received. The string may be received from a user through one or more UIs, or may be received from storage as a stored macro or serialized search. The search string may also be received one character at a time, and a new set of searches performed progressively each time a new character is received and added to the growing search string. The received search string is expected to be a text string, with attributes spelled out in text form. However, since the received search string will be normalized so that non-text elements are converted into standardized text or standardized search symbols, the received search string can be any combination of alphanumeric characters, symbols assigned to the ASCII set, tokens, and/or international alphabet characters. In some variations, the search string can also comprise check box input, soft key input, clicked icons, etc.

At block 604, the search string is normalized. Normalization consists of converting the received string into searchable terms that are intelligible for searching particular EPG information sources, that is, that have a format that matches the format of data in the EPG information to be searched. The aim is to eliminate mere differences in the text, case, and character formalisms from preventing a match between search terms and EPG information that would otherwise have produced a hit but for the differences in the formalisms. Hence, normalization is a whole toolkit of spell-checking, auto-correcting, term separation, letter case standardization, symbol normalization, article of speech elimination, punctuation removal, etc. both of the search terms and possibly of the target database information. For example, "mash" and "M*A*S*H*"

will always match regardless of whether either form is found in a search term, in a target piece of information being searched, or both.

At block 606, the search string is separated into text terms and attribute terms. This separation effects and accompanies an interpretation of the search string. The separation into text terms and attribute terms results in some interpretation as well as some transformation and transposition of the searchable terms provided by normalization. Since the average search string is typically only five or six search terms or less, a scheme may be followed of trying all possible combinations of the search terms in various size groupings and in all possible orders. Hence, the search string can be scrambled to test various groupings and combinations of the search terms.

As the various candidate search terms and search phrases (groupings) are produced, they can be tested or interpreted against a preexisting list of attributes to determine which of the search terms and phrases are known attributes. The candidate search terms can also be tested against any search results that may have already been performed on the search string, since sometimes the various searches performed on a search string are not done simultaneously but performed sequentially or iteratively according to conditional search logic that may be set up as search constraints during the interpretation of a search string mentioned above.

A quick scan of the words in the search phrase may also reveal other details intended by the user, which constitute another element of interpretation. If there are many small articles and connecting words, such as "in," "and," "is," and "the," then the search string might be interpreted as a natural language entry. However, a short search string with only a few concise terms is likely to be interpreted as a Boolean style search.

At block 608, one or more searches are conducted for each text term and each attribute term. Relatively complex search queries can be set up depending on the text and attribute terms present and how they relate to each other. As an unlikely but illustrative example, the search string "western after 1980 sci-fi actors" might be interpreted as "search for westerns created after 1980 but only those with actors who have also starred in science fiction movies." Such a search would entail searching a "westerns" category and using subtractive logic to eliminate both those westerns created before 1980 and those westerns having no actors who also starred in science fiction movies. Many text term and attribute term searches can be performed at once, as well as sequentially or iteratively depending on results received. Hence, a search engine performing the exemplary method 600, such as the exemplary search engine 204 can be a search manifold, initiating searches that transpire "in all directions at once."

At block 610, search results are combined, ranked, and/or filtered for display. The combining is usually carried out according to Boolean relationships postulated during separation of attribute terms from text terms. That is, how the search results are combined is predetermined in part by the interpretation of the search string achieved during separation of text and attribute terms and during query formation. How the results are given relevancy ranking may also depend on the interpretation achieved earlier in the process. Filtering may depend on preset user preferences for display, or may depend on a scheme in which results bearing a relevancy ranking below a threshold are eliminated from view.

At block 612, search results are displayed to the user. The results may be displayed after all the searching is done, but they may also be displayed as they are received and compiled. In a progressive search, the results are displayed as fast as the search string is being input, each entered character beginning a whole new set of searches.

The above-describe exemplary method 600 is just one example of the subject matter. It is not meant to be limiting, but to describe one example process that may have many variations available to a user.

Exemplary Computing Device

FIG. 7 shows an exemplary computer 700 suitable as an environment for practicing aspects of the subject matter. The components of exemplary computer 700 may include, but are not limited to, a processing unit 720, a system memory 730, and a system bus 721 that couples various system components including the system memory 730 to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

The exemplary computer 700 typically includes a variety of computer-readable media. Computer-readable media can be any available media that can be accessed by exemplary computer 700 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within exemplary computer 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, an exemplary search engine 204, other program modules 736, and program data 737. Although the exemplary search engine 204 is depicted as software in random access memory 732, other implementations of an exemplary search engine 204 can be hardware or combinations of software and hardware.

The exemplary computer 700 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface such as interface 750.

The drives and their associated computer storage media discussed above and illustrated in FIG. 7 provide storage of computer-readable instructions, data structures, program modules, and other data for exemplary computer 700. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the exemplary computer 700 through input devices such as a keyboard 762 and pointing device 761, commonly referred to as a mouse, trackball, or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port, or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer may operate in a networked environment using logical connections to one or more remote computers, such as a remote computer 780. The remote computer 780 may be a personal computer, a server, a router, a network PC, a peer device or other common network node, and typically includes many or all of the elements described above relative to exemplary computer 700, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets, and the Internet.

When used in a LAN networking environment, the exemplary computer 700 is connected to the LAN 771 through a network interface or adapter 770. When used in a WAN networking environment, the exemplary computer 700 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the exemplary computer 700, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Of course, the subject matter can also be used in many other environments, such as a set top box having appropriate hardware, a game console, and many other types of processing devices. Each of these environments may contain some but not all of the components described above for the exemplary computer 700.

Conclusion

It should be noted that the subject matter described above can be implemented in hardware, in software, or in both hardware and software. In certain implementations, the exemplary system and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems and methods for free-text and attribute searching of EPG data. Although the invention has been described in language specific to structural features and/or methodological acts, it is to be understood that the subject matter defined in the appended claims is not necessarily limited to the specific features or acts described. Rather, the specific features and acts are disclosed as exemplary forms of implementing the claimed invention.

APPENDIX A

Exemplary List of Attributes

```
<?xml version="1.0" encoding="utf-8" standalone="yes"?>
<searchInfo>
    <categoryAndAttributeMappings separatorChar="|">
        <mapping keywords="closed captioned|closed captioning|closed captions" field="ScheduleEntryAttribute" value="MSEPGA_CC" />
        <mapping keywords="stereo" field="ScheduleEntryAttribute" value="MSEPGA_STEREO" />
```

APPENDIX A-continued

Exemplary List of Attributes

```
<mapping keywords="repeat|rerun|re run"
field="ScheduleEntryAttribute" value="MSEPGA_REPEAT" />
    <mapping keywords="live" field="ScheduleEntryAttribute"
value="MSEPGA_LIVE" />
    <mapping keywords="subtitled|subtitles"
field="ScheduleEntryAttribute" value="MSEPGA_SUBTITLED" />
    <mapping keywords="season premiere|season premier"
field="ScheduleEntryAttribute" value="MSEPGA_SEASONPREMIERE" />
    <mapping keywords="season finale" field="ScheduleEntryAttribute"
value="MSEPGA_SEASONFINALE" />
    <mapping keywords="series premiere|season premier"
field="ScheduleEntryAttribute" value="MSEPGA_SERIESPREMIERE" />
    <mapping keywords="series finale" field="ScheduleEntryAttribute"
value="MSEPGA_SERIESFINALE" />
    <mapping keywords="premiere" field="ScheduleEntryAttribute"
value="MSEPGA_PREMIERE" />
    <mapping keywords="finale" field="ScheduleEntryAttribute"
value="MSEPGA_FINAL" />
    <mapping keywords="letterbox" field="ScheduleEntryAttribute"
value="MSEPGA_LETTERBOX" />
    <mapping keywords="hdtv" field="ScheduleEntryAttribute"
value="MSEPGA_HDTV" />
    <mapping keywords="sap" field="ScheduleEntryAttribute"
value="MSEPGA_SAP" />
    <mapping keywords="dolby" field="ScheduleEntryAttribute"
value="MSEPGA_DOLBY" />
    <mapping keywords="dvs" field="ScheduleEntryAttribute"
value="MSEPGA_DVS" />
    <mapping keywords="rated pg 13|rated pg13"
field="ProgramRatingAttribute" value="MSEPGR_PG13" />
    <mapping keywords="rated pg" field="ProgramRatingAttribute"
value="MSEPGR_PG" />
    <mapping keywords="rated nc 17|rated nc17"
field="ProgramRatingAttribute" value="MSEPGR_NC17" />
    <mapping keywords="rated g" field="ProgramRatingAttribute"
value="MSEPGR_G" />
    <mapping keywords="rated r" field="ProgramRatingAttribute"
value="MSEPGR_R" />
    <mapping keywords="rated x" field="ProgramRatingAttribute"
value="MSEPGR_X" />
    <mapping keywords="rated ao" field="ProgramRatingAttribute"
value="MSEPGR_AO" />
    <mapping keywords="paid programming" field="ProgramAttribute"
value="MSEPGA_PAIDPROGRAMMING" />
    <mapping keywords="miniseries" field="ProgramAttribute"
value="MSEPGA_MINISERIES" />
    <mapping keywords="action adventure series" field="Category"
value="Series-701" />
    <mapping keywords="action adventure movie|action adventure movies"
field="Category" value="CMOVIE_ACTIONADV" />
    <mapping keywords="action adventure" field="Category"
value="CMOVIE_ACTIONADV|Series-701" />
    <mapping keywords="comedy|comedies" field="Category" value="Movies-
504|Series-703|Kids-303" />
    <mapping keywords="comedy series" field="Category" value="Series-
703" />
    <mapping keywords="comedy movie" field="Category" value="Movies-504"
/>
    <mapping keywords="documentary|documentaries" field="Category"
value="Educational-103" />
    <mapping keywords="drama" field="Category"
value="CMOVIE_DRAMA|Series-705" />
    <mapping keywords="educational series" field="Category"
value="Series-706" />
    <mapping keywords="educational" field="Category" value="Series-
706|Kids-304|Educational-1" />
    <mapping keywords="movies" field="Category" value="MSEPGC_MOVIES" />
    <mapping keywords="peliculas" field="Category" value="MSEPGC_MOVIES"
/>
    <mapping keywords="music" field="Category" value="Movies-508|Series-
709|Special-803" />
    <mapping keywords="news" field="Category" value="MSEPGC_NEWS" />
    <mapping keywords="science fiction movie|science fiction movies"
field="Category" value="Movies-511" />
    <mapping keywords="science fiction" field="Category" value="Movies-
511" />
```

APPENDIX A-continued

Exemplary List of Attributes

```
<mapping keywords="fantasy movie|fantasy movies" field="Category" value="Movies-506" />
<mapping keywords="fantasy" field="Category" value="Movies-506" />
<mapping keywords="soap operas|soaps" field="Category" value="Series-711" />
<mapping keywords="sports" field="Category" value="News-605|Special-805|MSEPGC_SPORTS" />
<mapping keywords="adults only|xxx" field="Category" value="Movies-502|Lifestyle-401" />
<mapping keywords="kids movies" field="Category" value="Movies-503" />
<mapping keywords="kids series" field="Category" value="Series-702" />
<mapping keywords="kids" field="Category" value="Series-702|Movies-503|Kids-3" />
<mapping keywords="musicals" field="Category" value="Movies-508" />
<mapping keywords="mystery movies|mysteries|mystery" field="Category" value="Movies-509" />
<mapping keywords="love stories|romance" field="Category" value="Movies-510" />
<mapping keywords="suspense" field="Category" value="Movies-512" />
<mapping keywords="westerns|western" field="Category" value="Movies-513" />
<mapping keywords="animated|cartoon" field="Category" value="Kids-302" />
<mapping keywords="baseball|mlb" field="Category" value="CBASEBALL" />
<mapping keywords="basketball|nba" field="Category" value="CBASKETBALL" />
<mapping keywords="boxing" field="Category" value="CBOXING" />
<mapping keywords="football|nfl" field="Category" value="CFOOTBALL" />
<mapping keywords="golf|pga|lpga|usga" field="Category" value="CGOLF" />
<mapping keywords="hockey|nhl" field="Category" value="CHOCKEY" />
<mapping keywords="outdoor sports" field="Category" value="COUTDOOR" />
<mapping keywords="racing" field="Category" value="CRACING" />
<mapping keywords="soccer" field="Category" value="CSOCCER" />
<mapping keywords="tennis" field="Category" value="CTENNIS" />
<mapping keywords="sports news" field="Category" value="News-605" />
<mapping keywords="sports" field="Category" value="MSEPGC_SPORTS|News-605" />
<mapping keywords="business news|financial news" field="Category" value="News-601" />
<mapping keywords="interviews|interview" field="Category" value="News-602" />
<mapping keywords="public affairs" field="Category" value="News-604" />
<mapping keywords="weather" field="Category" value="News-606" />
<mapping keywords="cooking" field="Category" value="Series-704" />
<mapping keywords="game shows|game show" field="Category" value="Series-707" />
<mapping keywords="how to|howto" field="Category" value="Series-708" />
<mapping keywords="talk shows|talk show" field="Category" value="Series-712" />
<mapping keywords="travel" field="Category" value="Series-713" />
<mapping keywords="religious" field="Category" value="Special-804|Lifestyle-409" />
<mapping keywords="holidays|holiday" field="Category" value="Special-802" />
<mapping keywords="biography" field="Category" value="Educational-102" />
<mapping keywords="science" field="Category" value="Educational-105" />
<mapping keywords="collectibles" field="Category" value="Lifestyle-402" />
<mapping keywords="exercise" field="Category" value="Lifestyle-404" />
<mapping keywords="health" field="Category" value="Lifestyle-405" />
<mapping keywords="home garden" field="Category" value="Lifestyle-406" />
<mapping keywords="international" field="Category" value="Lifestyle-407" />
```

APPENDIX A-continued

Exemplary List of Attributes

```
    <mapping keywords="outdoors" field="Category" value="Lifestyle-408" />
    <mapping keywords="primetime|prime time" field="TimeOfDay"
value="1140|1380" />
    <mapping keywords="morning" field="TimeOfDay" value="300|720" />
    <mapping keywords="afternoon" field="TimeOfDay" value="720|1080" />
    <mapping keywords="evening" field="TimeOfDay" value="1020|1200" />
    <mapping keywords="late night" field="TimeOfDay" value="1380|300" />
  </categoryAndAttributeMappings>
</searchInfo>
```

The invention claimed is:

1. A method of searching electronic program guide (EPG) data, comprising:
 receiving a text search string by way of a search string receiver, wherein the text search string contains one or more text terms and one or more attribute terms;
 normalizing the text search string to make searchable terms by:
  applying spell checking to the text search string,
  identifying a word as being misspelled, and
  appending a corrected form of the word identified as being misspelled to the searchable terms to conduct a conditional search based on the corrected form of the word;
 separating the searchable terms into text terms and attribute terms by way of a string interpreter, the string interpreter parsing the text search string to separate the searchable terms into the text terms and the attribute terms by comparing the searchable terms with a list of attributes for identifying the attribute terms;
 performing a text search in the EPG data for each text term;
 performing an attribute search in the EPG data for each attribute term; and
 ranking results from the text and attribute searches for displaying search results conforming to the text search string, the ranking comprising lowering a relevancy ranking of hits resulting from the conditional search on the corrected form of the word when search results are obtained based on the word identified as being misspelled.

2. The method as recited in claim 1, wherein the normalizing comprises converting language formalities of the searchable terms to match language formalities of the EPG data.

3. The method as recited in claim 1, wherein the separating includes comparing the searchable terms with intermediate results obtained from an alternate text search using one or more of the attribute terms identified by comparing the searchable terms with the list of attributes to acquire additional information to separate the text terms from the attribute terms in addition to comparing the searchable terms with the list of attributes.

4. The method as recited in claim 1, wherein the separating further comprises grouping the searchable terms in various combinations to achieve a set of searchable phrases.

5. The method as recited in claim 4, wherein the separating further comprises transposing the order of at least two of the searchable terms before the grouping.

6. The method as recited in claim 5, further comprising comparing the searchable phrases created by transposing the order of the at least two searchable terms with the list of attributes to determine if any of the searchable phrases are attribute terms.

7. The method as recited in claim 1, wherein the list of attributes contains an index relating indexed attributes to destination resources and search values for each indexed attribute.

8. The method as recited in claim 1, wherein the list of attributes contains branching logic associated with an attribute in the list of attributes to guide a search using the attribute.

9. The method as recited in claim 6, wherein the list of attributes contains metadata about an attribute in the list of attributes to guide a search using the attribute.

10. The method as recited in claim 1, wherein the separating search terms comprises forming an interpretation of the user's intent in constructing the text search string.

11. The method as recited in claim 1, further comprising conducting an alternate attribute search of EPG data using one or more of the searchable terms for further separating the searchable terms into the text terms and the attribute terms based on results of the alternate attribute search in addition to comparing the searchable terms with the list of attributes.

12. A search engine implemented by a processor executing instructions contained on computer-readable storage media, the search engine comprising:
 a normalizer to apply spell checking to a search string for identifying a word as being misspelled, the normalizer appending a corrected form of the word identified as being misspelled to search terms in the search string to conduct a conditional search based on the corrected form of the word;
 a string interpreter communicatively coupled with a list of attributes, the string interpreter postulating the meaning of terms in the search string, the string interpreter further comprising an attribute identifier for separating attribute terms from text terms in the search string by comparing candidate attribute terms in the search string with the list of attributes for identifying the attribute terms;
 a query generator coupled with the string interpreter, the query generator generating one or more attribute queries for searching electronic program guide (EPG) data based upon the attribute terms identified and generates one or more text queries for searching the EPG data based on the text terms; and
 a results ranker to lower a relevancy ranking of hits resulting from the conditional search on the corrected form of the word when at least one of the one or more attribute queries or the one or more text queries return hits that contain the word identified as being misspelled.

13. The search engine as recited in claim 12, wherein the search engine performs searches in EPG databases and web-based EPG resources.

14. The search engine as recited in claim 12 further comprising a results compiler having a search comparator/filter and the results ranker.

15. The search engine as recited in claim 14, wherein the search comparator/filter compares search results with the meaning of terms postulated by the string interpreter.

16. The search engine as recited in claim 14, wherein the results ranker assigns a relevancy ranking to search results based on the meaning of terms postulated by the string interpreter.

17. One or more computer readable storage media containing instructions that are executable by a computer to perform actions comprising:
receiving a text search string;
formatting the text search string into search terms compatible with electronic program guide (EPG) data to be searched;
deriving text terms and attribute terms from the search terms by comparing the search terms with a list of attributes for identifying the attribute terms based upon the list of attributes, the attributes being searchable characteristics of programs;
applying spell checking to the text search string;
identifying a word as being misspelled;
appending a corrected form of the word identified as being misspelled to the search terms to conduct a conditional search based on the corrected form of the word;
performing one or more text searches of program title data in the EPG data for each text term;
performing one or more attribute searches of program attribute data in the EPG data for each attribute term identified;
combining results of the one or more text searches with results of the one or more attribute searches to obtain search result hits;
assigning a relevancy rank to each search result hit;
lowering a relevancy ranking of hits resulting from the conditional search on the corrected form of the word when search results are obtained based on the word identified as being misspelled; and
displaying hits filtered by relevancy.

18. The one or more computer readable storage media containing instructions as recited in claim 17, wherein the formatting comprises one of auto-correcting, term separating, letter case normalizing, punctuation removing, symbol normalizing, article eliminating, and pluralizing the search string.

19. The one or more computer readable storage media containing instructions as recited in claim 17, further including instructions to perform searches using a word-stemmed version of a search term.

20. The one or more computer readable storage media containing instructions as recited in claim 17, further including instructions to perform searches using a word-branched version of a search term.

21. The one or more computer readable storage media containing instructions as recited in claim 17, further including instructions to group the search terms in various combinations to achieve a set of search phrases.

22. The one or more computer readable storage media containing instructions as recited in claim 21, further including instructions to transpose the order of at least two of the search terms before performing the instructions to group the search terms.

23. The one or more computer readable storage media containing instructions as recited in claim 21, further including instructions to conduct an alternate attribute search of EPG data using one or more of the text terms for further separating the search terms into the text terms and the attribute terms based on results of the alternate attribute search in addition to comparing the searchable terms with the list of attributes.

24. The one or more computer readable storage media containing instructions as recited in claim 17, wherein the deriving text terms and attribute terms further includes forming an interpretation of the user's intent in constructing the text search string.

25. The one or more computer readable storage media containing instructions as recited in claim 24, further comprising instructions to combine, rank, and filter search results in accordance with the interpretation.

26. A search engine for electronic program guide (EPG) data, the search engine being implemented by a processor executing instructions contained on computer-readable storage media, the search engine comprising:
a normalizer to apply spell checking to a text search string for identifying a word as being misspelled, the normalizer appending a corrected form of the word identified as being misspelled to search terms in the text search string to conduct a conditional search based on the corrected form of the word;
an attribute identifier to separate attribute terms from text terms by parsing the text search string to achieve a text and attribute aware interpretation of the text search string;
a query generator to generate a query for searching electronic program guide (EPG) data based upon the attribute terms and the text terms; and
a results ranker to lower a relevancy ranking of hits resulting from the conditional search on the corrected form of the word when search results are obtained based on the word identified as being misspelled.

27. A method of searching electronic program guide (EPG) data, comprising:
receiving a text search string by way of a search string receiver, the text search string containing one or more text terms for searching program titles and one or more attribute terms for searching program characteristics;
normalizing the text search string by removing or converting symbols in the text search string to form searchable terms, the normalizing further comprising:
applying spell checking to the text string,
identifying a word as being misspelled, and
appending a corrected form of the word identified as being misspelled to the searchable terms to conduct a conditional search based on the corrected form of the word;
determining, by a processor, one or more known attribute terms by comparing the searchable terms with a list of known attributes for identifying the known attribute terms, the list of known attributes relating to non-title characteristics of programs searchable in the EPG data;
identifying as text terms remaining terms not identified as known attribute terms;
performing a text search of program title data in the EPG data for each text term identified from the text search string to obtain first intermediate results;
performing an attribute search in the EPG data for each known attribute term identified from the text search string to obtain second intermediate results;
conducting an alternate attribute search of EPG data using one or more of the text terms to obtain third intermediate results for determining whether the one or more text terms are attribute terms not listed in the list of known attributes;

conducting an alternate text search using one or more of the known attribute terms identified by comparing the searchable terms with the list of attributes to acquire additional information to obtain fourth intermediate results for verifying that the known attribute terms are not text terms; and performing one of combining, ranking, and filtering the first, second, third and fourth intermediate results from the text and attribute searches for displaying search results conforming to the text search string, the ranking comprising lowering a relevancy ranking of hits resulting from the conditional search on the corrected form of the word when search results are obtained based on the word identified as being misspelled.

28. The method as recited in claim 27, wherein the list of known attributes contains an index relating indexed attributes to destination resources and search values for each indexed attribute.

29. The method as recited in claim 27, wherein the list of known attributes contains metadata about an attribute in the list of known attributes to guide a search using the attribute.

* * * * *